(12) United States Patent
Imboden

(10) Patent No.: US 11,714,983 B1
(45) Date of Patent: Aug. 1, 2023

(54) APPARATUS AND METHOD FOR DIGITAL CURRENCY

(71) Applicant: John Imboden, Olive Branch, MS (US)

(72) Inventor: John Imboden, Olive Branch, MS (US)

( * ) Notice: Subject to any disclaimer, the term of this patent is extended or adjusted under 35 U.S.C. 154(b) by 6 days.

(21) Appl. No.: 17/571,215

(22) Filed: Jan. 7, 2022

Related U.S. Application Data

(60) Provisional application No. 63/135,512, filed on Jan. 8, 2021.

(51) Int. Cl.
*G06K 19/04* (2006.01)
*G06K 19/07* (2006.01)

(52) U.S. Cl.
CPC ....... *G06K 19/047* (2013.01); *G06K 19/0718* (2013.01); *G06K 19/0723* (2013.01)

(58) Field of Classification Search
CPC .................................................. G06K 19/047
USPC ......................................................... 235/492
See application file for complete search history.

(56) References Cited

U.S. PATENT DOCUMENTS

| 5,046,841 A | 9/1991 | Juds et al. | |
| 6,629,591 B1 * | 10/2003 | Griswold | G07F 1/06 463/25 |

| 2002/0163421 A1 | 11/2002 | Wang et al. |
| 2013/0146657 A1 | 6/2013 | Graef et al. |

FOREIGN PATENT DOCUMENTS

| JP | 4130991 | 10/2004 |
| JP | 2013246566 | 12/2013 |
| KR | 19980083483 | 12/1998 |
| KR | 101886736 | 9/2018 |
| WO | 2014136338 | 9/2014 |
| WO | 2019067801 | 4/2019 |

* cited by examiner

*Primary Examiner* — Rafferty D Kelly
(74) *Attorney, Agent, or Firm* — John Rizvi; John Rizvi, P.A.—The Patent Professor

(57) ABSTRACT

An apparatus and method directed to a coin-type digital currency device that provides for a portable smart coin that has a universal and variable value with enhanced security features. The coin-type digital currency device is activated for a transaction and placed in a position proximate to a communications device and the communications device is altered that a transaction is awaiting execution. A secure communications link is established between the coin-type digital currency device and the communications device using a combination of RF and optical communications. Once the secure communications is established, the transaction is approved, executed, and registered together with updating the currency balance associated with the coin-type digital currency device.

20 Claims, 15 Drawing Sheets

APPARATUS AND METHOD FOR DIGITAL CURRENCY

CROSS-REFERENCE TO RELATED APPLICATION

This application claims the benefit of U.S. Provisional Application 63/135,512, filed Jan. 8, 2021, which is hereby incorporated by reference herein in its entirety.

FIELD OF THE INVENTION

The present invention relates generally to digital currency, and more particularly, to an apparatus and method directed to a coin-type digital currency device that provides for a portable smart coin that has a universal and variable value with enhanced security features.

BACKGROUND OF THE INVENTION

Digital currency is a currency form that is available in electronic or digital form, but not in physical form. Digital currencies exist and are only accessible with electronic devices, for example, computers and smartphones. That is, digital currencies are intangible and are owned and transacted by using computers or electronic wallets that have access to the Internet or specifically designated computer networks. Digital currencies have all the intrinsic properties of physical currency (e.g., banknotes or minted coins) and allow for instantaneous transactions that are seamlessly executed for making payments across borders and geographic boundaries when the parties are interconnected to supported hardware devices and networks. For example, a manufacturer located in the United States can make a payment to a supplier in Taiwan provided that both are connected to the same network for digital currency transactions.

Today, a number of digital currency, regulated or unregulated, variants exist such as cryptocurrencies and virtual currencies. A cryptocurrency is another form of digital currency that uses cryptography to secure and verify transactions and to manage and control the creation of new currency units. Currently, cryptocurrencies are unregulated so they may also be considered so-called virtual currencies. That is, virtual currencies are an unregulated digital currency that is controlled by its developers, a founding organization, or a defined network protocol.

For instance, Bitcoin is a digital currency created in 2009 that offers the promise of lower transaction fees than traditional online payment forms and is operated by a decentralized authority in distinction from government-issued currencies, for example. There are no physical Bitcoins only public ledger balances that everyone has transparent access to that are verified by computer networks in the context of Bitcoin transactions. Bitcoins are not issued or backed by any banks or governments nor are individual Bitcoins valuable as a commodity themselves. They are not legal tender in the traditional sense, but their popularity has been on a recent rise. To buy Bitcoin, a person will download a Bitcoin wallet that will store the person's Bitcoins for future spending or trading Bitcoin balances, given Bitcoin is not really a "coin", are maintained using public and private keys that are long number strings and letters linked through mathematical encryption algorithms. A public key is the location where transactions are deposited to and withdrawn from, and the public key appears in a blockchain ledger as a user's digital signature. A private key is the password required to buy, sell, and trade Bitcoin in the Bitcoin wallet. Like any other passwords they should be strong in nature and can be encrypted for further security protection. In the U.S., the Securities and Exchange Commission requires users to verify their identities (e.g., using a driver's license or Social Security Number) when registering their digital wallets in an effort to promote anti-money laundering policies. Once established, the digital wallet can used like any other traditional payment method such as a credit card or debit card to buy Bitcoins on a Bitcoin exchange. Once purchased, the Bitcoins are transferred to the buyer's digital wallet.

Cryptocurrencies of all types use a distributed layer technology known as blockchain. Blockchains act as a decentralized system for recording and documenting transactions that involve a specific digital currency. In essence, blockchain is a transaction ledger that maintains identical copies across each computer of a member network and the fact that the ledger is distributed across part of the network facilitates the security of blockchain. Given these security features, blockchain technology is on a significant growth path with companies across a wide variety of industries. A Blockchain relies on three important components that are private key technology, a distributed network that includes a shared ledger, and an accounting means for the transactions and records across the network. A blockchain is a list of records (called blocks) that are cryptographically linked together such that each block contains a cryptographic hash of the previous block, a timestamp, and transaction data. Thus, a blockchain is highly resistant to date modification due to the design feature that once recorded the data in any given block cannot be altered without alteration of all subsequent blocks. In many applications, the constructed distributed ledger is managed by a peer-to-peer network that allows participants to verify and audit transactions in an efficient manner By combining the use of cryptographic keys with a distributed network, blockchain expands the type and number of digital transaction possibilities.

Despite significant advances in the type and number of different digital currencies, there still remain a number of associated risks that have impacted the widespread adoption of a single (or predominant) digital currency. For example, Bitcoin pricing has exhibited a high volatility in the absence of regulations and Bitcoin trades on multiple exchanges that introduce variable exchange rates. Further, widespread adoption of blockchain is subject to challenges ranging from technology cost to establish the necessary network computing power, the need for significant computer programming investment to provide custom design and backend programming to integrate blockchain to current business networks, and political and regulatory hurdles. Further, overcoming the inherent human element whereby people maintain a certain connection and desire to handle physical currency as opposed to a purely digital currency form.

Accordingly, there is need for an apparatus and method directed to a coin-type digital currency device that provides for a portable smart coin that has a universal and variable value with enhanced security features.

SUMMARY OF THE INVENTION

The present invention is directed to an apparatus and method directed to a coin-type digital currency device that provides for a portable smart coin that has a universal and variable value with enhanced security features.

In a first implementation of the invention, a coin-type digital currency device is provided comprising at least a body having a predetermined form factor; a base having a cavity; a battery embedded within the cavity of the base; an integrated circuit portion embedded within the body and coupled to the battery, the integrated circuit portion further comprising at least a processor, one or more memory devices, an antenna, a communications transceiver, a bus controller, a graphics processing unit and an input/output (I/O) controller; an optical communication portion coupled to the integrated circuit portion, the optical communication portion further comprising a plurality of a light emitting diodes (LEDs) and a plurality of image capture devices; and a fingerprint recognition and detection portion coupled to the optical communication portion and the integrated circuit portion. In accordance with the embodiment, one or more of the memory devices store instructions that cause the processor to perform operations comprising at least: (i) activating the coin-type digital currency device for use in a transaction associated with the user using at least the fingerprint recognition and detection portion and the plurality of LEDs; (ii) transmitting, using at least the antenna and the communication transceiver, a first RF signal to a communications device alerting the communications device that the transaction is awaiting execution and containing at least a first identification code specific to the coin-type digital currency device, the coin-type digital currency device being in a position proximate to the communications device; (iii) establishing a secure communications link between the coin-type digital currency device and the communications device through verifying an identity of the coin-type digital currency device and the communications device by (a) transmitting a second RF signal, between the coin-type digital currency device and the communications device, communicating the first identification code specific to the coin-type digital currency device and a second identification code specific to the communication device, and (b) receiving, from the communication device, a visual communication signal, the visual communication signal comprising a visual pattern defined by a series of lines and/or geometric shapes represented using a variety of colors, the visual pattern being specific to and recognizable by the coin-type digital currency device using at least the plurality of image capture devices and the graphics processing unit, the visual pattern presented via a visual display on the communications device; (iv) upon the verifying of the identity of the coin-type digital currency device and the communication device, approving, by the coin-type digital currency device, the transaction; (v) executing the transaction by transmitting at least one encrypted RF signal, between the coin-type digital currency device and the communications device, identifying a set of transaction details including at least a merchant identification, and receiving at least one retransmission, during the transmitting of the at least one encrypted RF signal, of the visual communication signal to the coin-type digital currency device to verify that the coin-type digital currency device remains in the position proximate to the communications device during the transmitting of the at least one encrypted RF signal; and (vi) registering the transaction and updating a currency balance associated with the coin-type digital currency device. In this way, the coin-type digital currency device provides for a portable smart coin that has a universal and variable value with enhanced security features. Also, notably, the coin-type digital currency device not only identifies the user and their associated account but also verifies the currency balance associated with the account without a further communication to a remote approval source.

In a second aspect, a method is provided for using a portable smart coin that has a universal and variable value with enhanced security features in a transaction (e.g., a purchasing transaction) with a third party (e.g., a merchant) in which the user of the portable smart is transferring financial currency to the third party.

In a third aspect, a method is provided for updating a portable smart coin that has a universal and variable value with enhanced security features.

In a fourth aspect, a method is provided for using a portable smart coin that has a universal and variable value with enhanced security features in a transaction (e.g., a payment transaction) with a third party (e.g., an employer) in which the user of the portable smart coin is receiving financial currency (e.g., a payment) from the third party.

In a fifth aspect, a method is provided for using a portable smart coin that has a universal and variable value with enhanced security features in a transaction (e.g., a credit transaction) with a third party (e.g., a bank) in which the user of the portable smart coin is borrowing financial currency (e.g., a credit transaction) from the third party.

In a sixth aspect, a method is provided for using a portable smart coin that has a universal and variable value with enhanced security features in a transaction (e.g., a bill payment transaction) with a third party (e.g., a merchant) in which the user of the portable smart is paying a bill (or other debit-type transaction) associated with a third party.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in the Figures herein. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward an apparatus and method directed to a coin-type digital currency device that provides for a portable smart coin that has a universal and variable value with enhanced security features. Also, notably, the coin-type digital currency device not only identifies the user and their associated account but also verifies the currency balance associated with the account without a further communication to a remote approval source.

Figure 1:
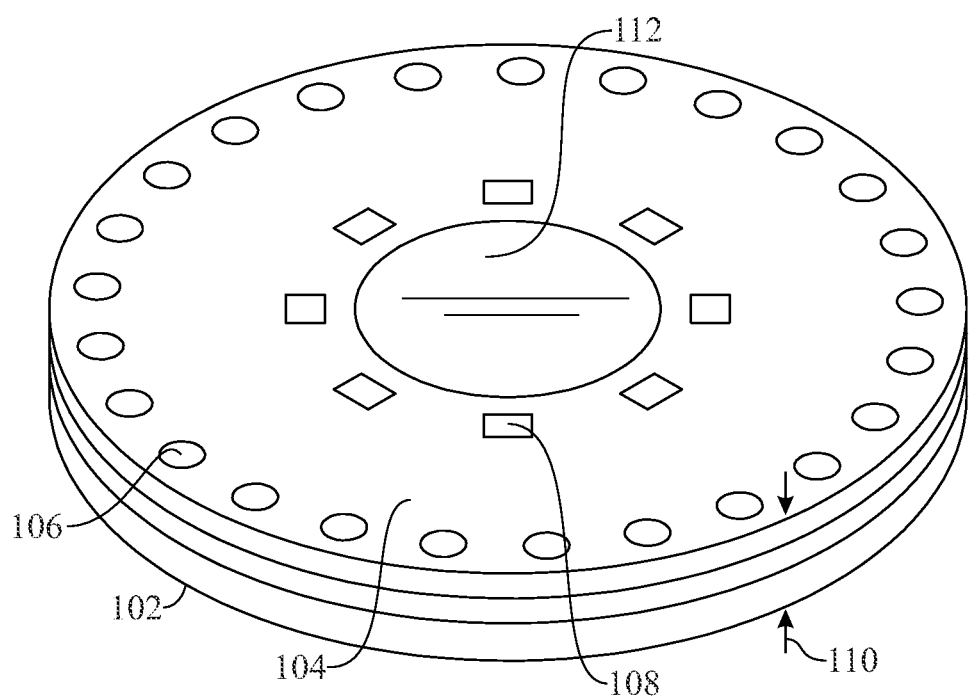
FIG. 1 presents an isometric view of a coin-type digital currency device in accordance with an embodiment.
Figure 2:
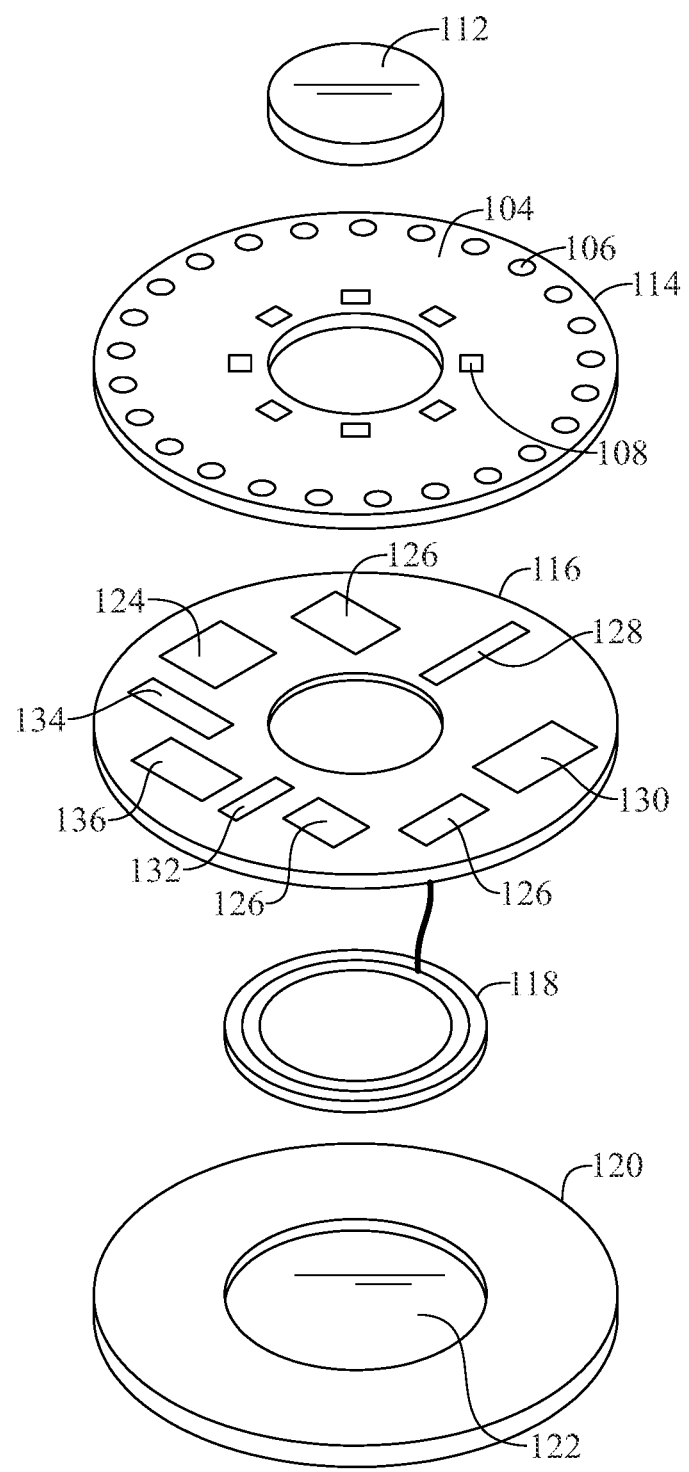
FIG. 2 presents an exploded isometric view of the coin-type digital currency device of FIG. 1 in accordance with an embodiment.

FIGS. 1 and 2 will now be discussed together and present an isometric view of a coin-type digital currency device 100 and an exploded isometric view of the coin-type digital currency device 100, respectively. In accordance with the embodiment shown, the coin-type digital currency device 100 (alternatively referred to herein as a "smart coin") comprises at least a body 102 having a predetermined form factor 110 and in this subject embodiment this is a coin shape form factor. The body 102 is made from any type of material that provides for lightweight and durable component structure such as a high temperature polymer material with grapheme and the body 102 is either clear in nature or has a window integrated therein to allow for optical communications as will be discussed herein below. Of course, this is one of many form factors that are suitable and consistent with the principles of the embodiments disclosed herein such a rectangular or cylindrical form factor, to name just a few. The base 120 has a cavity 122 formed therein in which the various others component layers of the coin-type digital currency device 100 are integrated therewith and thereon. In particular, a battery portion 118 is embedded within the cavity 122 of the base 122 and supplies power to the coin-type digital currency device 100. The battery portion 118 may be any type of small form battery component such as lithium ion and nickel-cadmium.

Integrated circuit portion 116 is embedded within the body 102 and coupled to the battery portion 118 and provides a variety of functionality. More particularly, the integrated circuit portion 116 further comprises at least a processor 124, one or more memory devices 126, an antenna 128, a communications transceiver 130, a bus controller 132, a graphics processing unit 136 and an input/output (I/O) controller 134. The processor 124, as powered by battery portion 118, may include both general and special purpose microprocessors, and may be the sole processor or one of multiple processors of the coin-type digital currency device 100. Further, the processor 124 may comprise one or more central processing units (CPUs) and may include, be supplemented by, or incorporated in, one or more application-specific integrated circuits (ASICs) and/or one or more field programmable gate arrays (FPGAs). For example, the processor 124 may be a well-known RISC processor. The bus controller 132 or other communication mechanism facilitates the communication of information among and between the individual components connected thereto such as the processor 124, the graphics processing unit 136 and the I/O controller 134 as all coupled to the bus controller 132 for executing operations and processing information in a well-known manner.

The coin-type digital currency device 100 may also include one or more memory 126 coupled to the bus controller 132 for storing computer-readable instructions to be executed by the processor 124 and/or the graphics processing unit 136 in a well-known manner. The memory 126 may also be utilized for storing temporary variables or other intermediate information during the execution of the instructions by the processor 124 and/or the graphics processing unit 136. For example, the graphics processing unit 136 is a specialized processor designed to rapidly manipulate and alter memory accelerate the creation of images intended for output to a display device (e.g., the display of a smartphone). The coin-type digital currency device 100 may also include, as part of the one or memory 126, read-only memory (ROM) or other static storage devices coupled to the bus controller 132. For example, the memory 126 may include a data storage device, such as a magnetic, optical, or solid state device may be coupled to the bus controller 132 for storing information and instructions for the processor 124 including, but not limited to, the method operations in accordance with the disclosed embodiments herein, as will be detailed herein below. Such memory 126 may each comprise a non-transitory computer readable storage medium and may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

As will be discussed in greater detail below, in accordance with the embodiment, one or the memory devices 126 stores instructions that cause the processor 124 to perform operations comprising at least: (i) activating the coin-type digital currency device for use in a transaction associated with the user using at least the fingerprint recognition and detection portion and the plurality of LEDs; (ii) transmitting, using at least the antenna and the communication transceiver, a first RF signal to a communications device alerting the communications device that the transaction is awaiting execution and containing at least a first identification code specific to the coin-type digital currency device, the coin-type digital currency device being in a position proximate to the communications device; (iii) establishing a secure communications link between the coin-type digital currency device and the communications device through verifying an identity of the coin-type digital currency device and the communication device by (a) transmitting a second RF signal, between the coin-type digital currency device and the communications device, communicating the first identification code specific to the coin-type digital currency device and a second identification code specific to the communication device, and (b) receiving, from the communication device, a visual communication signal, the visual communication signal comprising a visual pattern defined by a series of lines and/or geometric shapes represented using a variety of colors, the visual pattern being specific to and recognizable by the coin-type digital currency device using at least the plurality of image capture devices and the graphics processing unit, the visual pattern presented via a visual display on the communications device; (iv) upon the verifying of the identity of the coin-type digital currency device and the communications device, approving, by the coin-type digital currency device, the transaction; (v) executing the transaction by transmitting at least one encrypted RF signal, between the coin-type digital currency device and the communications device, identifying a set of transaction details including at least a merchant identification, and receiving at least one retransmission, during the transmitting of the at least one encrypted RF signal, of the visual communication signal to the coin-type digital currency device to verify that the coin-type digital currency device remains in the position proximate to the communications device during the transmitting of the at least one encrypted RF signal; and (vi) registering the transaction and updating a currency balance associated with the coin-type digital currency device. Importantly, as detailed above, the disclosed embodiments herein utilized a combination of RF communications (e.g., RFID) and optical communications (i.e., the visual pattern comprising a series of lines (e.g., vertical lines, horizontal lines, and/or diagonal lines) and/or geometric shapes (e.g., squares, triangles, rectangles, etc.) represented using a variety of colors, the visual pattern being specific to and recognizable by the coin-type digital currency device) for user and device verification and identification and transactional details associated with the use of the coin-type digital currency device 100. In accordance with an embodiment, the aforementioned visual pattern is defined in accordance with a standard configuration that is registered with and to a particular coin-type digital currency device 100 at the time of manufacture, for example, and stored in memory 126 together with a unique identification code also specific to the same coin-type digital currency device 100. Further, in accordance with an embodiment, the aforementioned visual pattern is also stored in a central server for later retrieval and use by a communication device used in combination with the coin-type digital currency device 100, as further discussed in detail herein below.

The coin-type digital currency device 100 may also include one or more communications transceiver 130 for communicating with other devices via a network (e.g., a wireless communications network) or communications protocol (e.g., Bluetooth®). For example, such communication interfaces may include establishing communications links with a communications device for either wired or wireless communications in any number of well-known fashions. Importantly, the communications transceiver 130 facilitates the transmission and receipt of radio frequency (RF) signals, for example, thereby allowing for wireless communications between the coin-type digital currency device 100 and any number of communications devices. In particular, in accordance with the an embodiment, the coin-type digital currency device 100 will utilize well-known radio-frequency identification (RFID) to facilitate certain security features associated with identifying and tracking the coin-type digital currency device 100 and its user (or alternatively referred to as its "owner"). In an embodiment, and as further detailed herein below, the coin-type digital currency device 100 will employ an embedded encrypted RFID tag that, in combination with optical code communications (i.e., the aforementioned visual communication signal comprising a series of lines and geometric shapes represented using a variety of colors, the visual communication signal being specific to and recognizable by the coin-type digital currency device) that will identity the user associated with the coin-type digital currency device 100 and an associated user account together with verifying a balance in the associated user account without the need for communication to a remote and/or third party approval source (e.g., a bank). As will be appreciated, a "communications device" in the context herein may comprise a wide variety of devices such as smartphones, laptop computers, tablets, and wearable device, to name just a few, that execute application programs (e.g., mobile applications) in accordance with the principles of the disclosed embodiments herein.

For example, the communications transceiver 130 may facilitate communications with an integrated services digital network (ISDN) card or modem/router used to facilitate data communications of various well-known types and formats. Further, illustratively, the communications transceiver 130 may enable communications with a local area network (LAN) card used to provide data communication connectivity to a comparable LAN. Wireless communication links may also be implemented. As will be appreciated, the functionality of the communication transceiver 130 is to send and receive a variety of signals (e.g., electrical, optical, or other signals) that transmit data streams representing various data types. The coin-type digital currency device 100 may also include one or more I/O devices 132 that enable user interaction with various types of user and/or communications devices (e.g., camera, display, keyboard, mouse, speakers, microphone, buttons, etc.).

Illustratively, the coin-type digital currently device 100 may be in communication with a cloud-based exchange comprising one or more servers, access points and databases. Cloud, cloud service, cloud server and cloud database are broad terms and are to be given their ordinary and customary meaning to one of ordinary skill in the art and includes, without limitation, any content database, data repository or storage media which store content typically associated with and managed by users, financial institutions, third party providers, credit services, to name just a few. A cloud service may include one or more cloud servers and cloud databases that provides for the exchange and/or manipulation of currency or other financial mechanisms. A cloud server may include an HTTP/HTTPS server sending and receiving messages in order to provide web-browsing interfaces to client web browsers as well as web services to send data to integrate with other interfaces. A cloud server may be implemented in one or more well-known servers and may send and receive content in a various forms and formats, user supplied and/or created information/content and profile/configuration data that may be transferred to, read from or stored in a cloud database.

A cloud database may include one or more physical servers, databases or storage devices as dictated by the cloud service's storage requirements. In accordance with the embodiments herein such databases may further include blockchain and/or encrypted databases. Illustratively, as will be detailed herein below, such a blockchain database may be used to store current currency balances, payee accounts, debt accounts, tax accounts, transaction record logs and/or identifies associated with users, financial institutions and/or merchants. The cloud database may further include one or more well-known databases (e.g., an SQL database) or a fixed content storage system to store content, profile information, configuration information or administration information as necessary to execute the cloud service. In various embodiments, one or more networks providing computing infrastructure on behalf of one or more users may be referred to as a cloud, and resources may include, without limitation, data center resources, applications (e.g., software-as-a-service or platform-as-a-service) and management tools.

As shown in FIG. 2, the coin-type digital currency device 100 further comprises an optical communication portion 114 coupled to the integrated circuit portion 116, the optical communication portion 114 further comprising a plurality of a light emitting diodes (LEDs) 106 and a plurality of image capture devices 108 (e.g., a plurality of digital cameras manufactured using metal-oxide-semiconductor field-effect transistors (MOSFET)). As noted above, the coin-type digital currency device 100 will employ an embedded encrypted RFID tag that, in combination with optical communications (i.e., the visual pattern comprising a series of lines (e.g., vertical, horizontal and/or diagonal) and/or geometric shapes (e.g., circles, squares, triangles, etc.) represented using a variety of colors, the visual communication signal being specific to and recognizable by the coin-type digital currency device) will identity the user associated with the coin-type digital currency device 100 and an associated user account together with verifying a balance in the associated user account without the need for communication to a remote and/or third party approval source (e.g., a bank). Illustratively, in accordance with an embodiment, the plurality of LEDs 106 are employed in connection with a specific identity that is registered for each individual coin-type digital currency device 100. The aforementioned registration occurs at the time of manufacture of the coin-type digital currency device 100 and the specific identity is a numerical identity that is a unique number with a maximum of twelve (12) digits. In an embodiment, the plurality of LEDs 106 will contain forty-six (46) LEDs with four (4) colors such that there can be a unique visual identification assigned to a total of 9.5 billion individual coin-type currency devices 100. As will be appreciated, in the event that unique visual identifier capacity is exhausted then the plurality of LEDs 106 may be modified accordingly to allow for an increase in the available unique visual identifiers. For example, the size of the individual LEDs of the plurality of LEDs 106 may be decreased thereby allowing for a larger number to be display on a face 104 of the coin-type digital currency device 100. Further, in accordance with an embodiment, the coin-type digital currency device 100 is also assigned a country of origin identification at the time of manufacture that is a permanent designation associated with the individual coin-type digital currency device 100.

Turning our attention back to FIG. 2, a fingerprint recognition and detection portion 112 is coupled to the optical communication portion 114 and the integrated circuit portion 116. As will be appreciated, the fingerprint recognition and detection portion 112 will provide for the automated method of identifying or confirming the identity of an individual (e.g., the user associated with a particular coin-type digital currency device 100) based on any number of well-known biometric fingerprint comparison techniques. Illustratively, in an embodiment, the user (i.e., owner) of the coin-type digital currency device 100 will, upon first receipt, place a finger (e.g., their thumb) on the surface of the fingerprint recognition and detection portion 112 and hold that position for a defined period of time (e.g., as defined visually by the plurality of LEDs 106 flashing at the end of the defined period of time) until their fingerprint identification is recorded and associated with the coin-type digital currency device 100. Further, in accordance with an embodiment, a further identification is associated with the coin-type digital currency device 100 that is a financial institution identification. This identification is requested by the user directly through the financial institution associated with coin-type currency device 100 and will be used for validating a current value associated with the coin-type currency device 100 and other transactions details in the context of credit and repayment transactions. For example, the financial institution may offer a sign-up process on their web site in a well-known manner for the purpose of assigning such identifications.

As detailed above, the coin-type digital currency device 100 employs a combination of optical and RF communications together with stored fingerprint identification, coin identification, financial institution information and currency/account information to deliver a secure smart coin and universal currency repository. Further, as will be discussed in greater detail below, in accordance with the embodiment, one or more of the memory devices 126 stores instructions that cause the processor to perform operations comprising at least: (i) activating the coin-type digital currency device for use in a transaction associated with the user using at least the fingerprint recognition and detection portion and the plurality of LEDs; (ii) transmitting, using at least the antenna and the communication transceiver, a first RF signal to a communications device alerting the communications device that the transaction is awaiting execution and containing at least a first identification code specific to the coin-type digital currency device, the coin-type digital currency device being in a position proximate to the communications device; (iii) establishing a secure communications link between the coin-type digital currency device and the communications device through verifying an identity of the coin-type digital currency device and the communication device by (a) transmitting a second RF signal, between the coin-type digital currency device and the communications device, communicating the first identification code specific to the coin-type digital currency device and a second identification code specific to the communication device, and (b) receiving, from the communication device, a visual communication signal, the visual communication signal comprising a visual pattern defined by a series of lines and/or geometric shapes represented using a variety of colors, the visual pattern being specific to and recognizable by the coin-type digital currency device using at least the plurality of image capture devices and the graphics processing unit, the visual pattern presented via a visual display on the communications device; (iv) upon the verifying of the identity of the coin-type digital currency device and the communications device, approving, by the coin-type digital currency device, the transaction; (v) executing the transaction by transmitting at least one encrypted RF signal, between the coin-type digital currency device and the communications device, identifying a set of transaction details including at least a merchant identification, and receiving at least one retransmission, during the transmitting of the at least one encrypted RF signal, of the visual communication signal to the coin-type digital currency device to verify that the coin-type digital currency device remains in the position proximate to the communications device during the transmitting of the at least one encrypted RF signal; and (vi) registering the transaction and updating a currency balance associated with the coin-type digital currency device. In this way, the coin-type digital currency device 100 provides for a portable smart coin that has a universal and variable value with enhanced security features that include, but are not limited to, the use of the aforementioned RF signaling in combination with the optical communications that employ the assigned coin identity, user/owner identity, country identity and financial institution identity, alone or in combination. Also, notably, the coin-type digital currency device 100 not only identifies the user and their associated account but also verifies the currency balance associated with the account without a further communication to a remote approval source. This may also be useful where currency value transfer is desired when transferring such currency value from one coin-type digital currency device to another, for example, in a coin replacement scenario by a user. In essence, the coin-type digital currency device 100 may be also viewed as an international universal value repository (IUVR).

Figure 7:
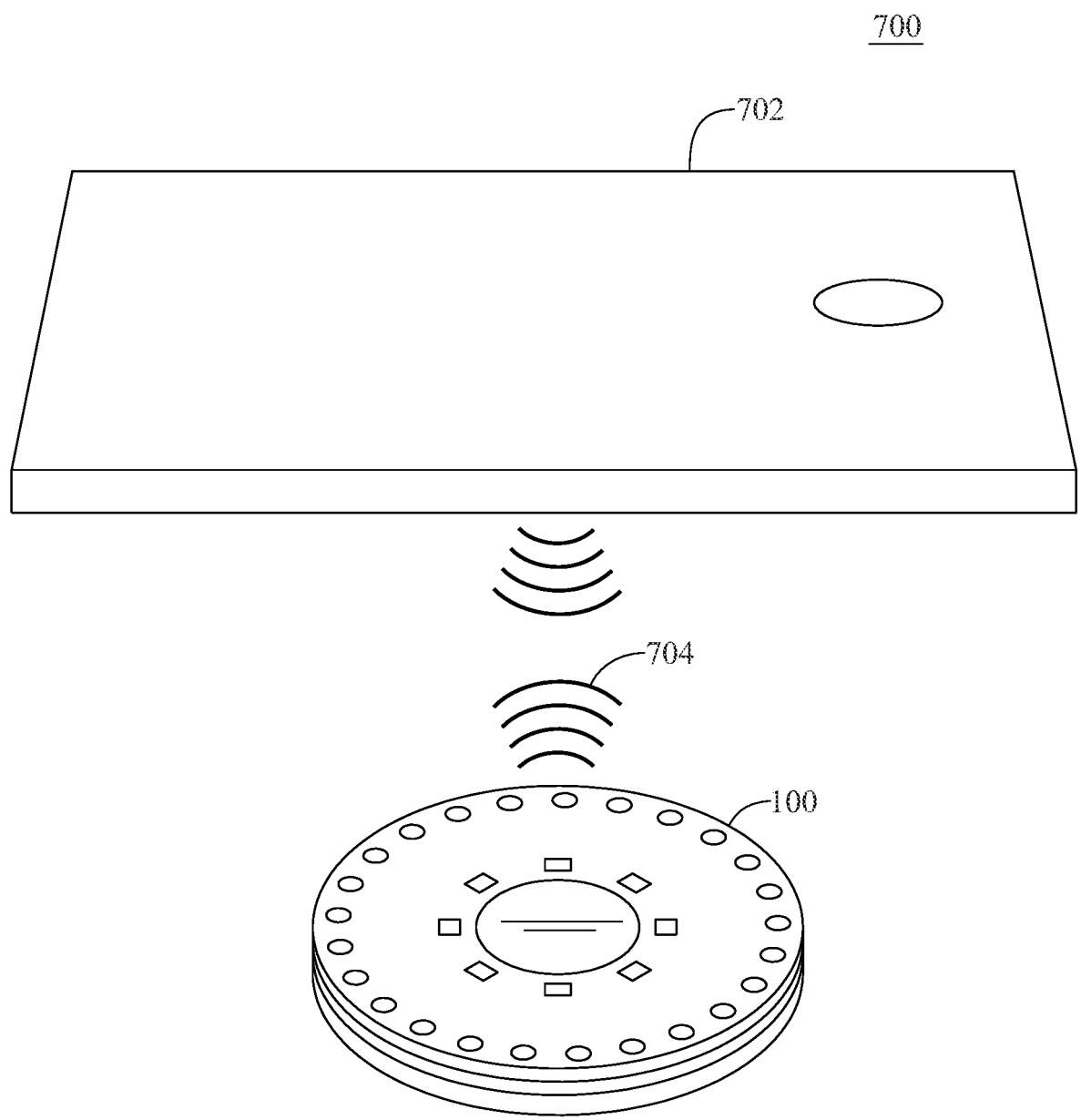
FIG. 7 presents an illustrative user device interface showing communications between a communications device and the coin-type digital currency device of FIG. 1 in accordance with an embodiment.
Figure 9:
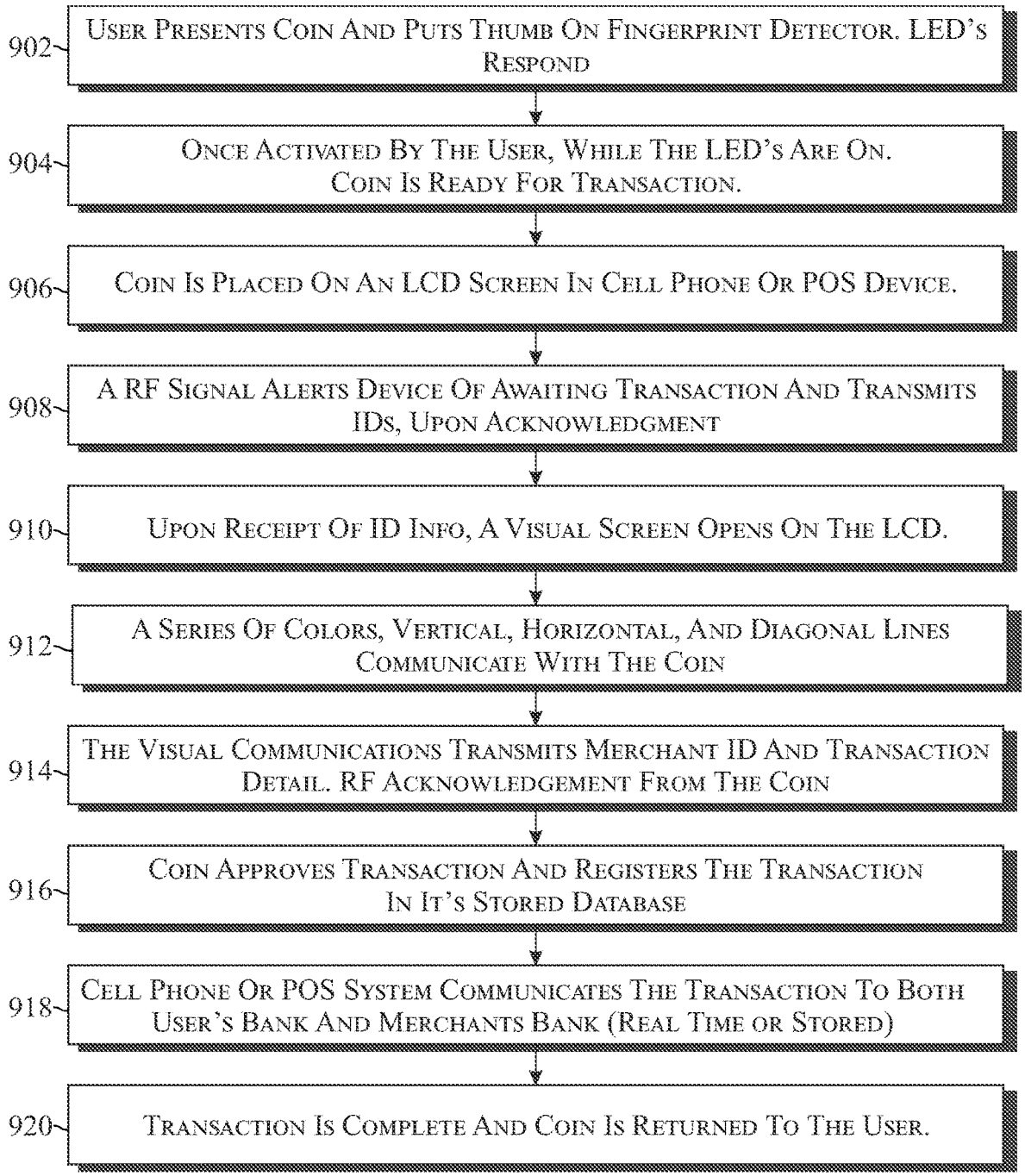
FIG. 9 presents a flowchart of illustrative operations for using the coin-type digital currency device of FIG. 1 in a purchasing transaction in accordance with an embodiment.

Now, turning our attention to FIG. 9, this figure presents a flowchart of illustrative operations 900 for using the coin-type digital currency device 100 of FIG. 1 in a purchasing transaction in accordance with an embodiment. More particularly, the operations 900 comprise activating the coin-type digital currency device 100 and initiating a transaction such that at step 902 the user presents the coin-type digital currency device 100 and places a finger (e.g., their thumb) on the surface of the fingerprint recognition and detection portion 112 and holds that position for a defined period of time (e.g., as defined visually by an illumination response from the plurality of LEDs 106 flashing at end of the defined period of time) until their fingerprint identification is verified as being associated with the coin-type digital currency device 100. Once the user's identification is so verified, the coin-type digital currency device 100 is activated, at step 904, and the plurality of LEDs 106 remain on. At step 906, the coin-type digital currency device 100 is placed proximate to a communications device (e.g., a smartphone or a point of sale (POS) terminal) and a communications link is established, and, at step 908, an RF signal and user identification information is transmitted to the communications device from the coin-type digital currency device 100 alerting the communications device of an awaiting transaction. For example, turning our attention briefly to FIG. 7, an illustrative user device interface 700 is shown for communications between a communications device 702 and the coin-type digital currency device 100 in accordance with an embodiment whereby the coin-type digital currency device 100 is placed proximate to (or directly on) the communications device 702. As noted above in step 908, the RF signal (and user identification information) is transmitted, across communications link 704, to the communication device 702 thereby alerting the communications device 702 of an awaiting transaction.

Figure 8:
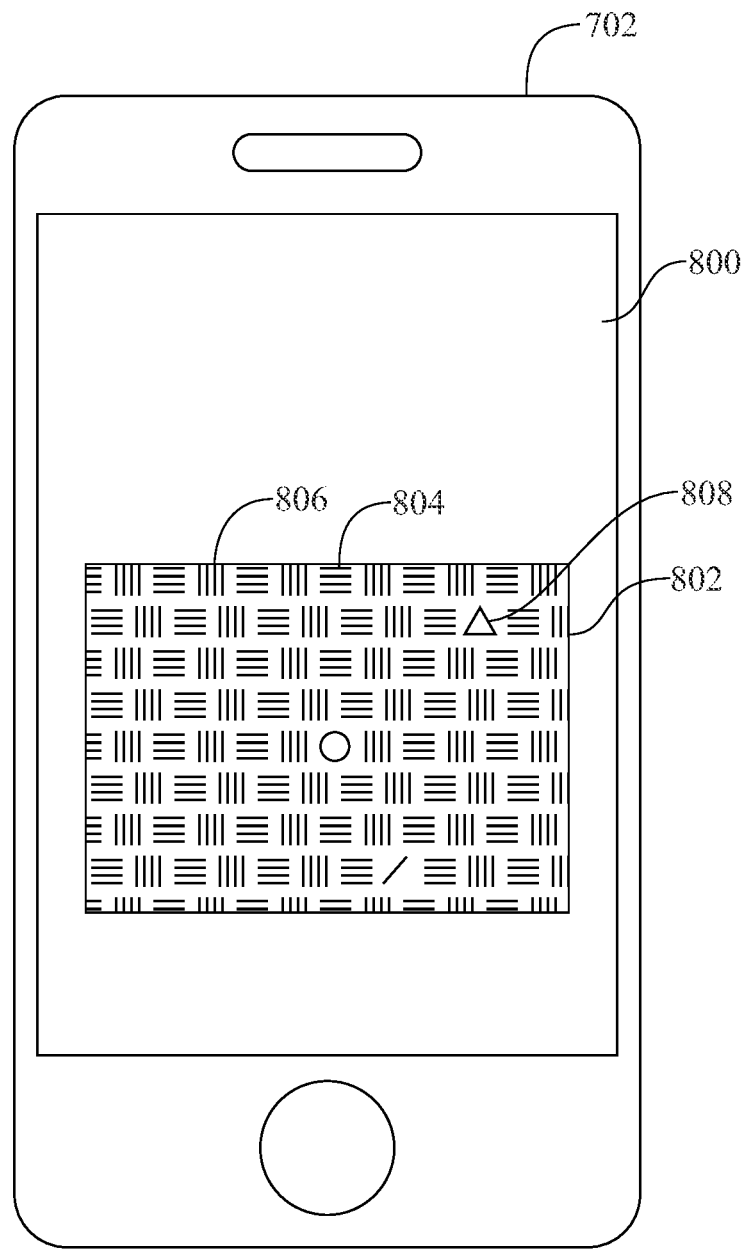
FIG. 8 presents an illustrative visual display for the communications device of FIG. 7 for facilitating the communications between the communications device and the coin-type digital currency device of FIG. 1 in accordance with an embodiment.

Then, responsive to the RF signal transmitted, there is the receipt, by the coin-type digital currency device 100, of a first acknowledgement signal from the communications device across the communications link 704. Responsive to the user identification information transmitted, a visual display is presented, at steps 910 and 912, on the communication device (e.g., the communications device 702) for communicating with the coin-type digital currency device 100, the visual pattern comprising a series of lines and/or geometric shapes, as represented in a series of colors, and communicating at least a merchant identification and transaction details. Turning our attention briefly to FIG. 8, an illustrative visual display 800 for the communications device 702 of FIG. 7 for facilitating the communications between the communications device 702 and the coin-type digital currency device 100 in accordance with an embodiment. As shown, visual display 800 contains a visual pattern 802 comprising a plurality of horizontal lines 804, a plurality of vertical lines 806 and a plurality of geometric shapes 808 for detection by the coin-type digital currency device 100. The plurality of horizontal lines 804, the plurality of vertical lines 806 and the plurality of geometric shapes 808 being shown in and represented by a series of colors (not shown). This detection is accomplished, in accordance with an embodiment, by and through the plurality of image capture devices 108 in a well-known manner that will capture the lines and colors accordingly. For example, the plurality of image capture devices 108 may be a plurality of MOSFET cameras that are well-known devices for detecting colors, patterns, angles, motion, and the like. In essence, the visual pattern 802 is akin to a well-known bar code, however, the visual pattern 802 is employed as a visual communication mechanism that allows for changing patterns and colors. By detecting the visual pattern 802, a visual communication is established between the coin-type digital currency device 100 and the communication device 702 whereby, at step 914, the visual communication enables the transmission of at least a merchant identification and other transaction details. Then, responsive to the visual display communication, there is the receipt of a second acknowledgement signal, by the communication device 702, of an RF signal sent from the coin-type digital currency device 100. Using the received merchant identification and other transaction details, at step 916, there is, by the coin-type digital currency device 100, an approving of the transaction, registering of the transaction and updating of the currency balance associated with the coin-type digital currency device 100. At step 918, the communications device (e.g., a cell phone) communicates the transaction to both the user's bank and the merchant's bank, either in real-time or storing the transaction details for a later transmission, and at step 920, the transaction is completed and the coin-type digital currency device 100 returned to the user. In accordance with an embodiment, the visual pattern 802 is retrieved by the communications device 702 upon a first transaction with the coin-type digital currency device 100 and stored locally on the communications device 702, in a well-known manner, for future use thereby eliminating the need to download the visual pattern 802 for each future transaction. As will be appreciated, the visual pattern 802 is one of numerous configurations that may be used in accordance with the various embodiments disclosed herein.

Figure 3:
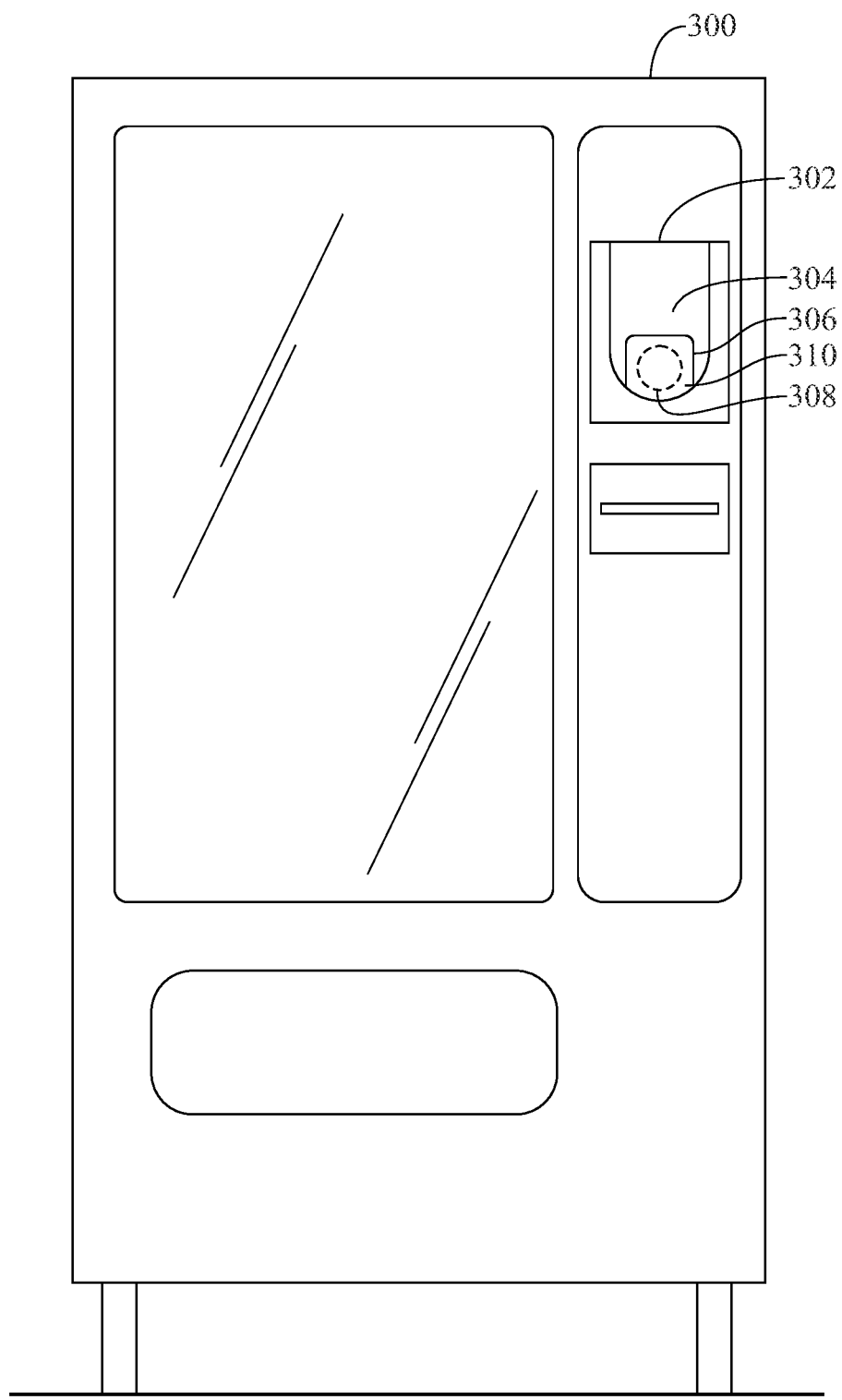
FIG. 3 presents an illustrative vending machine configured for employing the coin-type digital currency device of FIG. 1 in accordance with an embodiment.

Turning our attention to FIGS. 3-6 an illustrative example of using the coin-type digital currency device 100 will now be discussed. More particularly, FIG. 3 presents an illustrative vending machine 300 configured for employing the coin-type digital currency device 100 in accordance with an embodiment. The vending machine 300 comprising a coin slot payment mechanism 302 having a coin slot 304 for accepting the coin-type digital currency device 100. The coin slot payment mechanism 302 further comprises a coin transaction portion 306 having a RFID antenna 308 and LCD transceiver 310 for establishing a communication link with the coin-type digital currency device 100 when inserted into the coin slot mechanism 302. For example, when a user desires to purchase a vending machine item (e.g., a can of soda or bag of potato chips) from the vending machine 300.

Figure 4:
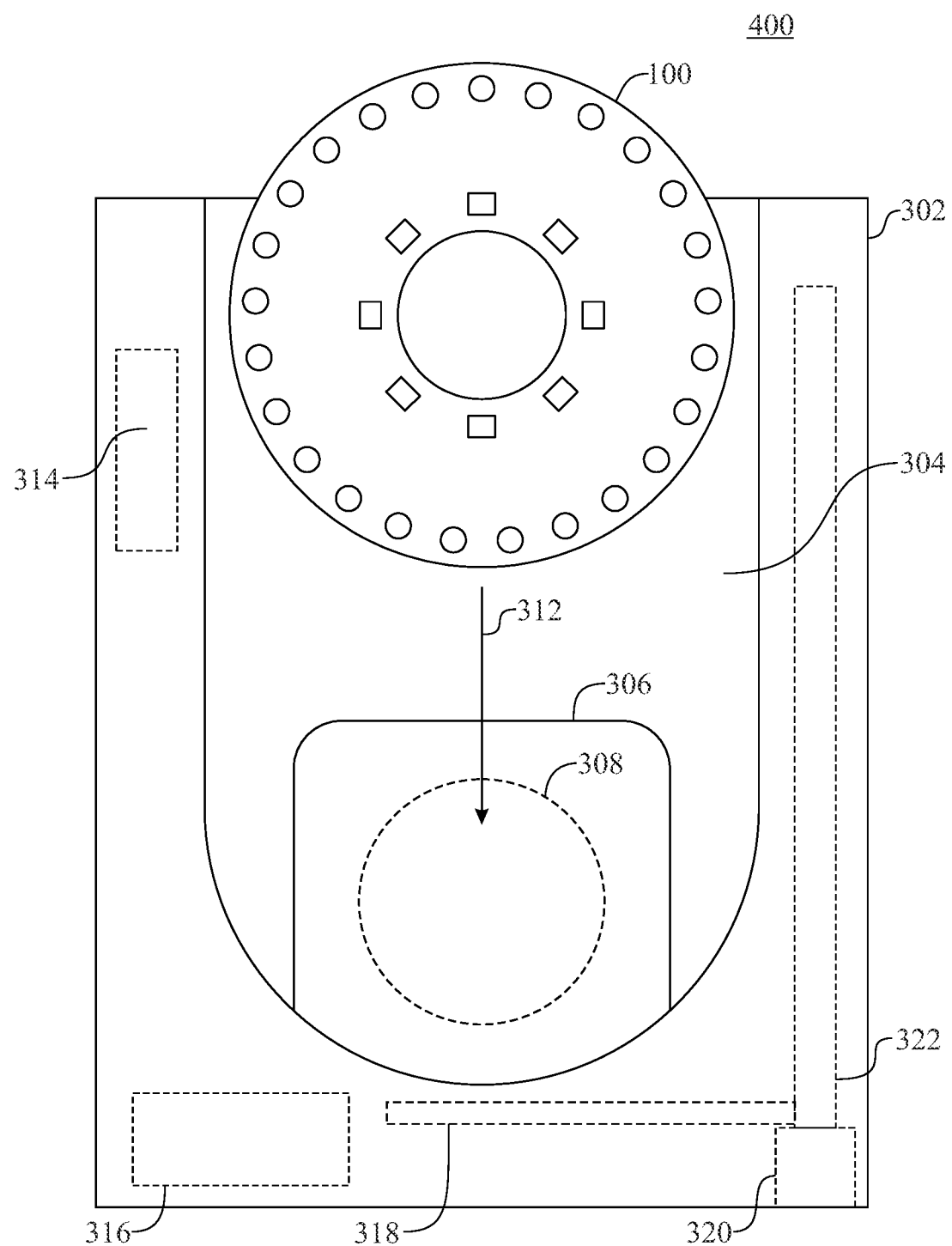
FIGS. 4, 5, and 6 present an illustrative coin slot configuration for the vending machine of FIG. 3 employing the coin-type digital currency device of FIG. 1 in accordance with an embodiment.
Figure 5:
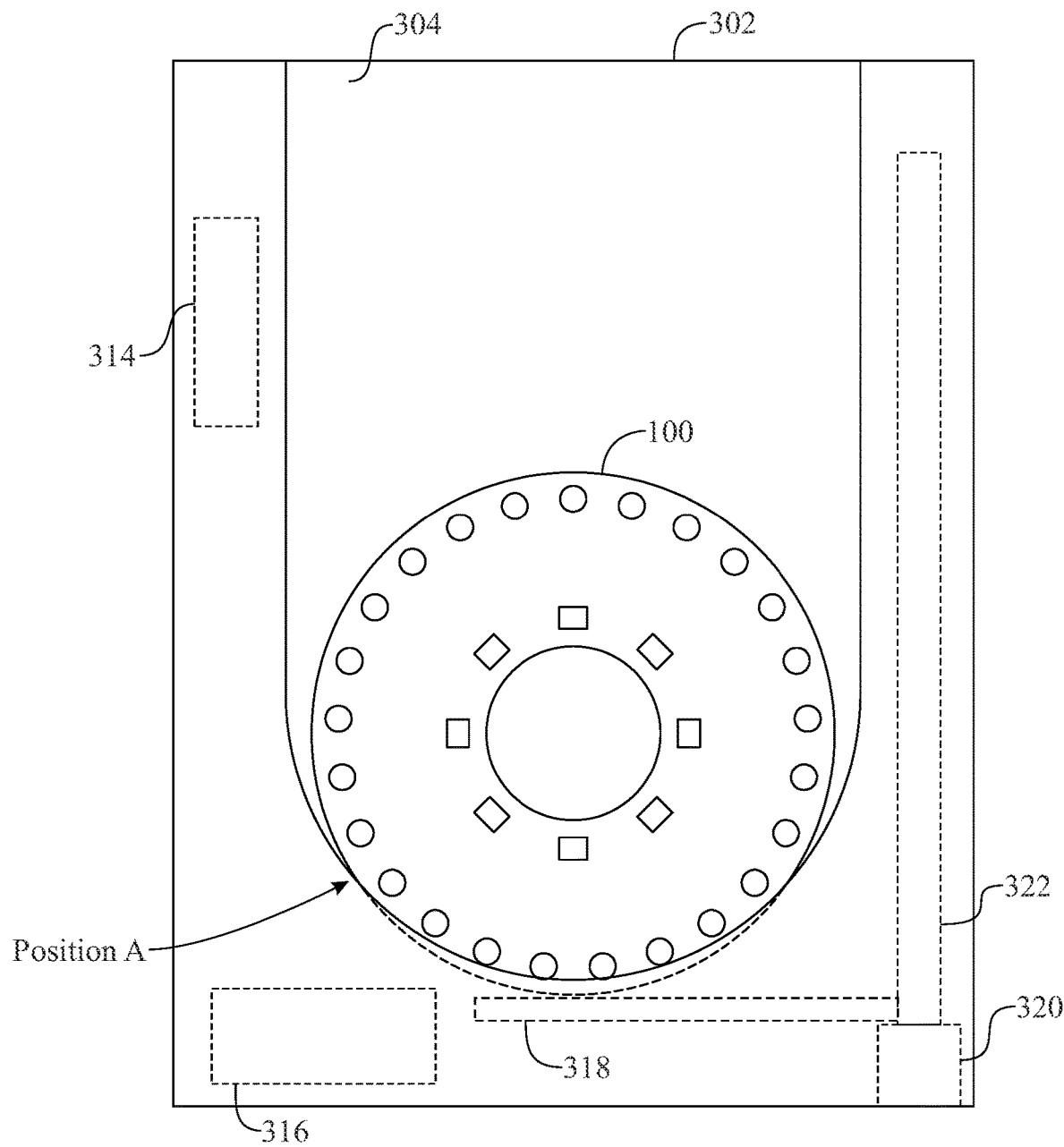
Figure 6:
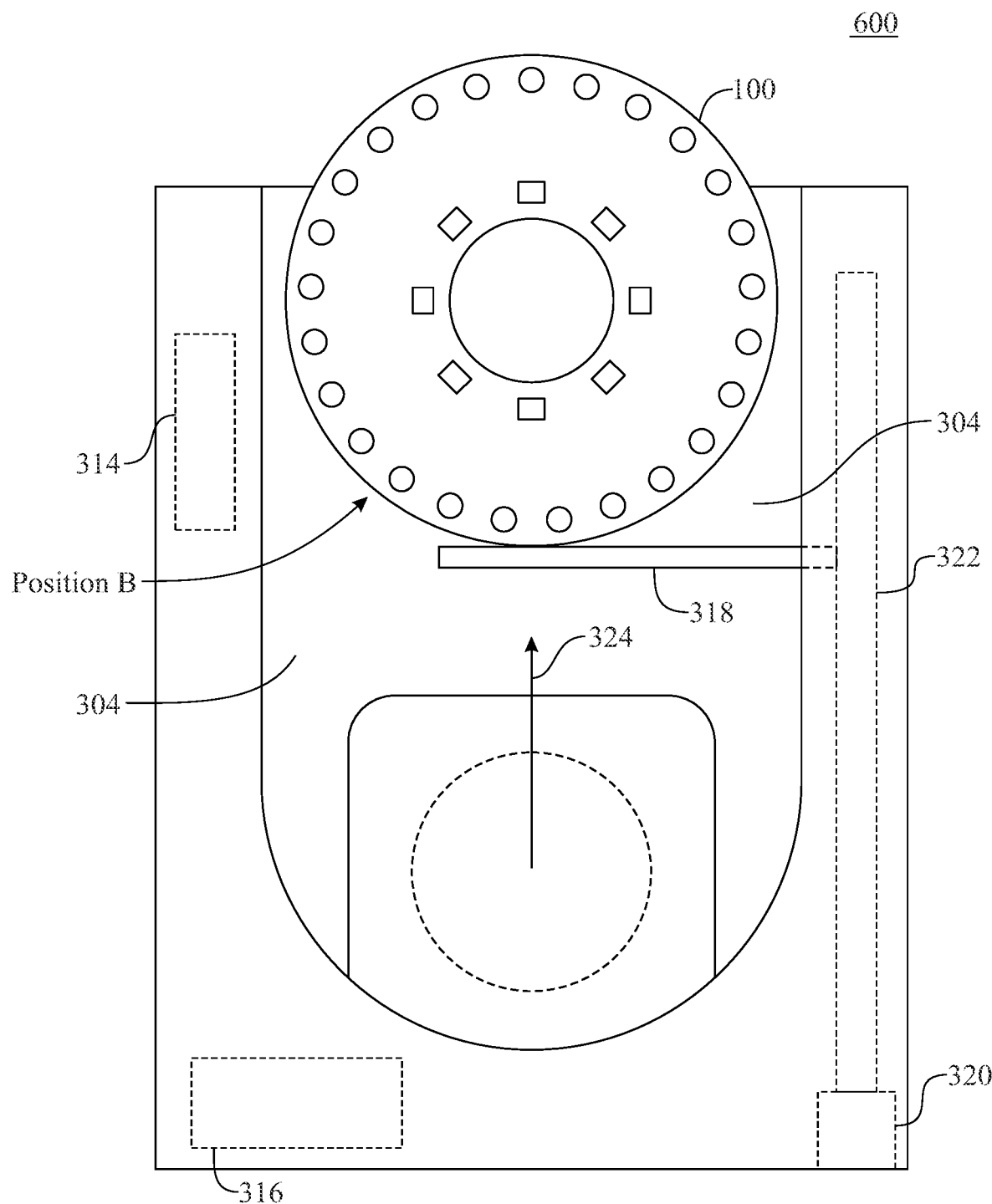

FIGS. 4, 5, and 6 present an illustrative coin slot configurations for the vending machine 300 of FIG. 3 employing the coin-type digital currency device 100 in accordance with an embodiment. In configuration 400 shown in FIG. 4, the coin-type digital currency device 100 is being dropped into the coin slot 304 along direction 312 of the coin slot mechanism 302, for example by a user standing (not shown) outside of the vending machine. This causes the coin-type digital currency device 100 to come to rest in Position "A" shown in configuration 500 of FIG. 5. As shown, the coin-type digital currency device 100 is at rest and in a position over and proximate to the RFID antenna 308 and the LCD transceiver 310 at the base of the coin slot 304 of the coin slot mechanism 302. As shown in FIG. 4, the vending machine 300 also comprises power supply 314, control board 316, coin eject activator 318, coin eject motor 320 and eject screw 322 that are configured for use with the coin-type digital currency device 100. Thus, when the coin-type digital currency device 100 comes to rest at Position "A" as shown in configuration 500 of FIG. 5 the coin-type digital currency device 100 is in contact with the coin eject activator 318 when in the aforementioned at rest position after being dropped into the coin slot 304. At this point, the illustrative operations as described above are executed whereby one or more of the memory devices 126 stores instructions that cause the processor 124 to perform operations comprising for: (i) activating the coin-type digital currency device 100 for use in a transaction associated with the user using at least the fingerprint recognition and detection portion 112 and the plurality of LEDs 106; (ii) transmitting, using at least the antenna 128 and the communication transceiver 130, a first RF signal to a communications device (e.g., communications device 702) alerting the communications device that the transaction is awaiting execution and containing at least a first identification code specific to the coin-type digital currency device, the coin-type digital currency device being in a position proximate to the communications device (in the illustrative example of FIGS. 3-6 this is the vending machine 300 as configured with the coin slot mechanism 302); (iii) establishing a secure communications link between the coin-type digital currency device and the communications device through verifying an identity of the coin-type digital currency device and the communication device by (a) transmitting a second RF signal, between the coin-type digital currency device and the communications device, communicating the first identification code specific to the coin-type digital currency device and a second identification code specific to the communication device, and (b) receiving, from the communication device, a visual communication signal, the visual communication signal comprising a visual pattern (e.g., visual pattern 802) defined by a series of lines and/or geometric shapes represented using a variety of colors, the visual pattern being specific to and recognizable by the coin-type digital currency device 100 using at least the plurality of image capture devices 108 and the graphics processing unit 136, the visual pattern presented via a visual display (e.g., visual display 800) on the communications device (e.g., communications device 702); (iv) upon the verifying of the identity of the coin-type digital currency device and the communication device, approving, by the coin-type digital currency device, the transaction; (v) executing the transaction by transmitting at least one encrypted RF signal, between the coin-type digital currency device and the communications device, identifying a set of transaction details including at least a merchant identification, and receiving at least one retransmission, during the transmitting of the at least one encrypted RF signal, of the visual communication signal to the coin-type digital currency device to verify that the coin-type digital currency device remains in the position proximate to the communications device during the transmitting of the at least one encrypted RF signal; and (vi) registering the transaction and updating a currency balance associated with the coin-type digital currency device. Upon transaction completion (e.g., buying an item dispensed by the vending machine 300), as shown in configuration 600 of FIG. 6, the coin-type digital currency device 100 is ejected along vertical direction 324 through the coin slot 304 by the coin eject activator 318 as raised by an activation, through the control board 316, of the coin eject motor 320 and eject screw 322. Upon ejection, a portion of the coin-type digital currency device 100 extends from the slot 304 for retrieval by the user as shown in Position B.

Figure 10:
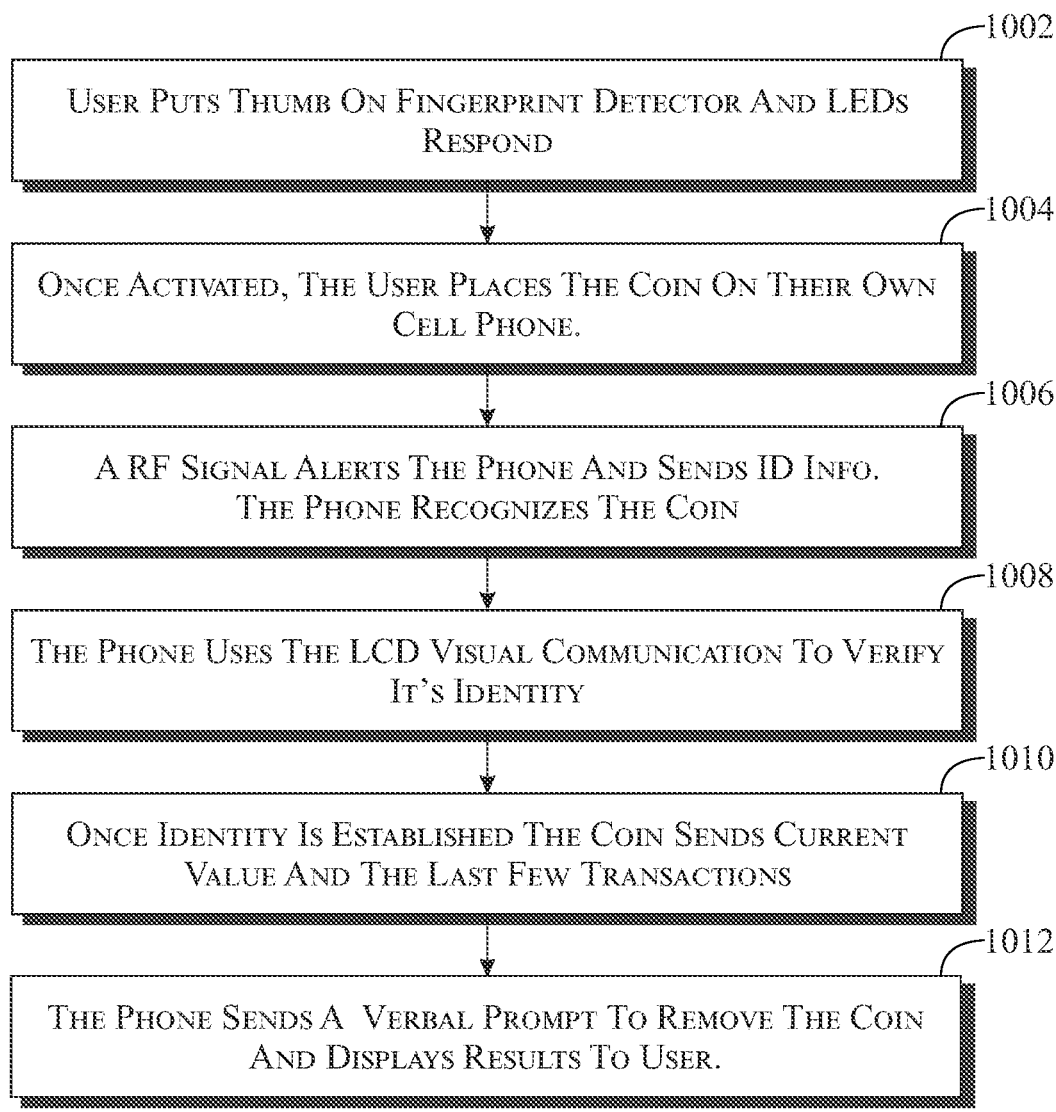
FIG. 10 presents a flowchart of illustrative operations for updating the coin-type digital currency device of FIG. 1 in accordance with an embodiment.

In this way, the coin-type digital currency device 100 provides for a portable smart coin that has a universal and variable value with enhanced security features that include, but are not limited to, the use of the aforementioned RF signaling in combination with the optical communications that employ an assigned coin identity, user/owner identity, country identity and financial institution identity, alone or in combination. Further, as noted above, the coin-type digital currency device 100 may be used for a variety of financial transactions including but not limited to the illustrative purchasing transaction as immediately described above. To that end, FIG. 10 presents a flowchart of illustrative operations 1000 for updating the coin-type digital currency device 100 of FIG. 1 in accordance with an embodiment. The operations 1000 comprising, activating the coin-type digital currency device 100 and initiating a transaction such that at step 1002 the user presents the coin-type digital currency device 100 and places a finger (e.g., their thumb) on the surface of the fingerprint recognition and detection portion 112 and holds that position for a defined period of time (e.g., as defined visually by an illumination response from the plurality of LEDs 106 flashing at end of the defined period of time) until their fingerprint identification is verified as being associated with the coin-type digital currency device 100. Once the user's identification is so verified, the coin-type digital currency device 100 is activated, at step 1004, and the plurality of LEDs 106 remain on. At step 1006, the coin-type digital currency device 100 is placed proximate to a communications device (e.g., a smartphone or a point of sale (POS) terminal) and a communications link is established, and an RF signal and user identification information is transmitted to the communications device from the coin-type digital currency device 100 alerting the communications device of an awaiting update transaction. Responsive to the user identification information transmitted, a visual pattern (e.g., visual pattern 802) is presented, at step 1008, on the communication device (e.g., cell phone) for communicating with the coin-type digital currency device 100, the visual pattern comprising a series of lines and/or geometric shapes and verifying an identity of the user of the coin-type digital currency device. Then, at step 1010, responsive to verifying the identity of the user of the coin-type digital currency device 100 transmitting, from the coin-type digital currency device 100, a current value associated with the coin-type digital currency device 100 and one or more completed transaction details (e.g., the last 10 user transactions). At step 1012, transmitting, from the communications device, a prompt (e.g., a verbal prompt) to remove the coin-type digital device 100 from the position proximate to the communications device and displaying update results to the user.

Figure 11:
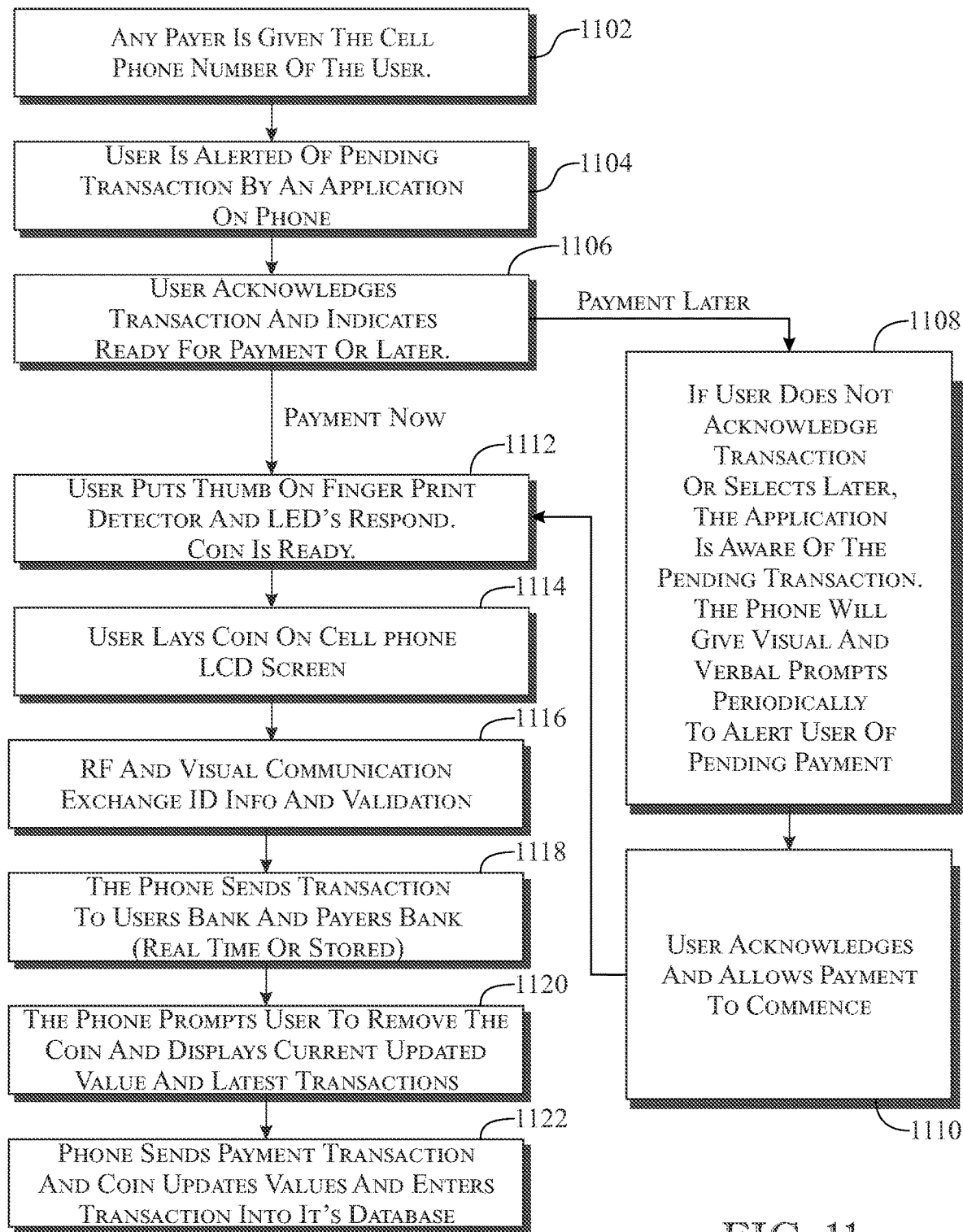
FIG. 11 presents a flowchart of illustrative operations for using the coin-type digital currency device of FIG. 1 in a transaction with a third party in which a user of the coin-type digital currency device is receiving financial currency from the third party in accordance with an embodiment.

Further, FIG. 11 presents a flowchart of illustrative operations 1100 for using the coin-type digital currency device 100 of FIG. 1 in a transaction with a third party in which a user of the coin-type digital currency device is receiving financial currency (e.g., a payment from an employer, governmental agency or any other third party entity) from the third party in accordance with an embodiment. The operations 1100 comprising receiving, at step 1102, contact information for a user (e.g., the user's cell phone number) and receiving, at step 1104, by a user of the coin-type digital currency device 100, an alert on a communication device (e.g., communications device 702) associated with the received user's contact information that a credit/borrowing transaction is pending. At step 1106, acknowledging, by the user, the transaction and indicating whether the user is ready for receiving a payment and if the user indicates a desire to defer the payment or does not send an acknowledgement, at step 1108, then the transaction is tagged as pending for execution a later time and reminders are sent such that, at a step 1110, the user provides the transaction acknowledgment and the subject payment commences from the third party to the user's coin-type digital currency device 100.

If the user indicates, at step 1106, a desire to receive the payment then the coin-type digital currency device 100 is activated, illustratively, the user places a finger (e.g., their thumb) on the surface of the fingerprint recognition and detection portion 112 and holds that position for a defined period of time (e.g., as defined visually by an illumination response from the plurality of LEDs 106 flashing at end of the defined period of time) until their fingerprint identification is verified as being associated with the coin-type digital currency device 100. Once the user's fingerprint identification is so verified, the coin-type digital currency device 100 is activated, at step 1112, and the plurality of LEDs 106 remain on for further visual verification. At step 1114, the coin-type digital currency device 100 is placed proximate to (or directly on or in contact with) the communications device (e.g., a smartphone) and a communications link is established, and, at step 1116, RF signal and visual communications are executed, as detailed above, for user validation and the exchange of user identification information. At step 1118, the communications device transmits transaction details to at least a first financial institution associated with the coin-type digital currency device 100 (e.g., the user's bank) and a second financial institution associated with the third party engaged in the transaction (e.g., an employer's bank). Then, at step 1120, transmitting, from the communications device, a prompt to remove the coin-type digital currency device 100 from the position proximate to the communications device (e.g., a cell phone) and displaying update results to the user (e.g., the current updated value associated with the coin-type digital currency device 100 and the past ten transactions made). At step 1122, executing the transaction whereby the communication device transmits the payment transaction and registering, by the coin-type digital currency device 100, the transaction and updating the currency balance associated with the coin-type digital currency device based on the transaction executed.

Figure 12:
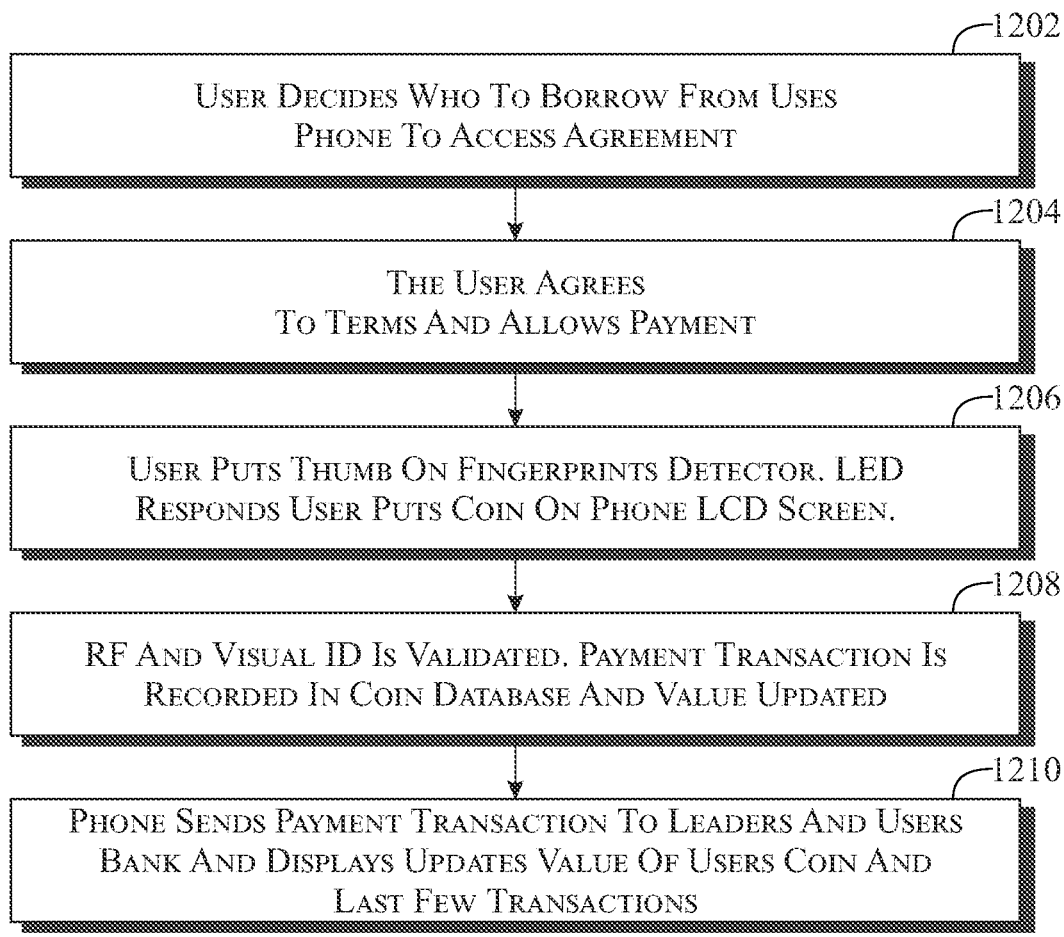
FIG. 12 presents a flowchart of illustrative operations for using the coin-type digital currency device of FIG. 1 in a transaction with a third party in which the user of the coin-type digital currency device is borrowing financial currency from the third party in accordance with an embodiment.

FIG. 12 presents a flowchart of illustrative operations 1200 for using the coin-type digital currency device 100 of FIG. 1 in a transaction with a third party in which the user of the coin-type digital currency device is borrowing financial currency (i.e., a credit transaction) from the third party in accordance with an embodiment. The operations 1200 comprising, at steps 1202 and 1204, deciding by the user on a first financial institution from which to seek borrowing funds and agreeing, using a communication device associated with the user, to a borrowing credit transaction in accordance with a set of credit borrowing terms and conditions from the first financial institution providing the funding for the borrowing credit transaction. At step 1206, the coin-type digital currency device 100 is activated, illustratively, the user places a finger (e.g., their thumb) on the surface of the fingerprint recognition and detection portion 112 and holds that position for a defined period of time (e.g., as defined visually by an illumination response from the plurality of LEDs 106 flashing at end of the defined period of time) until their fingerprint identification is verified as being associated with the coin-type digital currency device 100. Once the user's fingerprint identification is so verified, the coin-type digital currency device 100 is activated and the plurality of LEDs 106 remain on for further visual verification. Remaining with step 1206, the coin-type digital currency device 100 is placed proximate to (or directly on or in contact with) the communications device (e.g., a smartphone) and a communications link is established, and, at step 1208, RF signal and visual communications are executed, as detailed above, for user validation and the exchange of user identification information. At step 1210, the communications device transmits transaction details to at least a second financial institution associated with the coin-type digital currency device 100 (e.g., the user's bank) and the first financial institution associated with the third party engaged in the transaction (e.g., the bank making the loan or providing the credit). Remaining with step 1210, transmitting, from the communications device, a prompt to remove the coin-type digital currency device 100 from the position proximate to the communications device and displaying update results to the user (e.g., the current updated value associated with the coin-type digital currency device 100 and the past ten (10) transactions made), and executing the transaction whereby the communication device transmits the payment transaction and registering, by the coin-type digital currency device, the transaction and updating the currency balance associated with the coin-type digital currency device based on the transaction executed.

Figure 13:
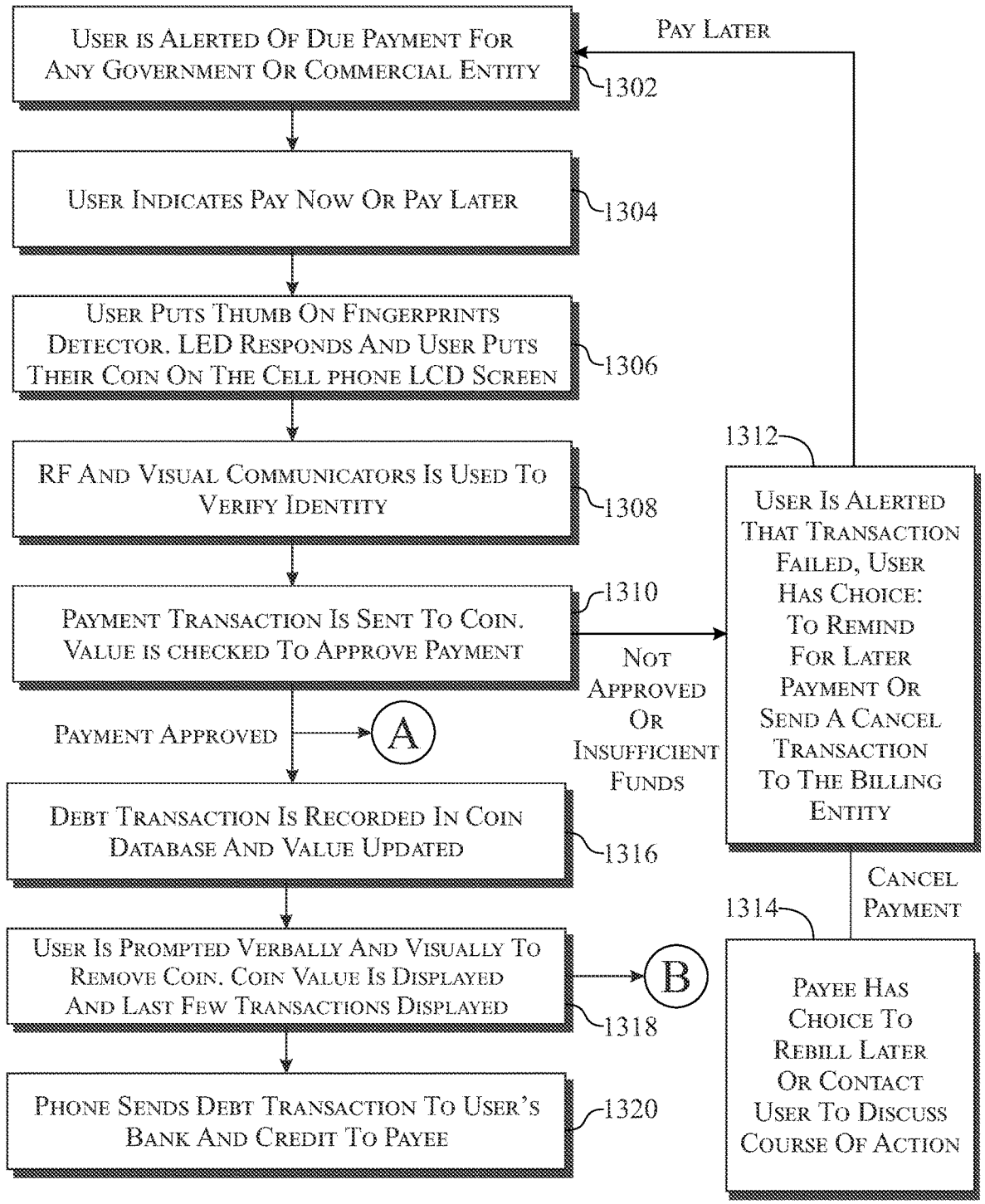
FIGS. 13, 14, and 15 present a flowchart of illustrative operations for using the coin-type digital currency device of FIG. 1 in a transaction with a third party in which the user of the coin-type digital currency device is paying a bill associated with a third party in accordance with an embodiment.
Figure 14:
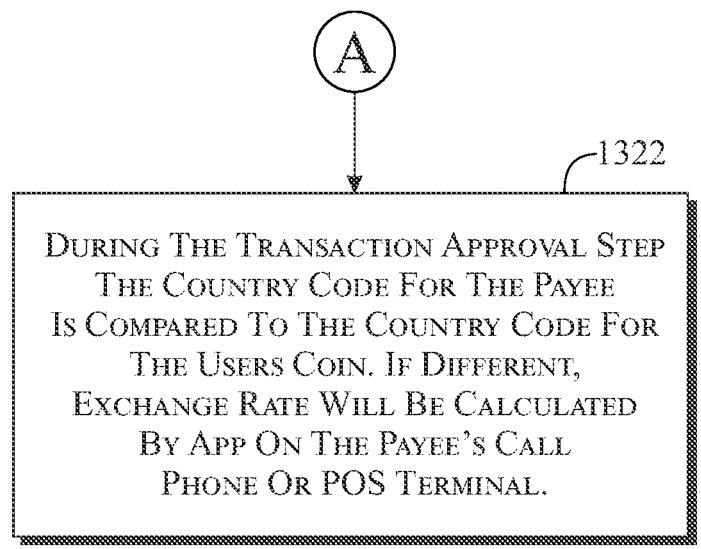
Figure 15:
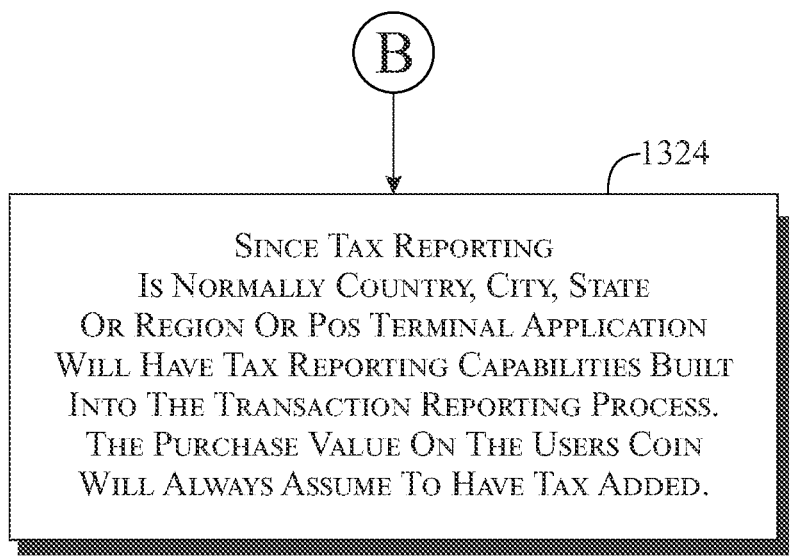

Next, turning our attention to FIGS. 13, 14, and 15 a flowchart of illustrative operations 1300 are presented for using the coin-type digital currency device of FIG. 1 in a transaction with a third party in which the user of the coin-type digital currency device is paying a bill associated with the third party in accordance with an embodiment. The operations 1300 comprising receiving, at step 1302, an alert that a payment is due to a third party (e.g., a commercial entity or governmental entity) and receiving, at step 1304, an indication from the user of the coin-type digital currency device 100 that they wish to make the payment now or defer to a later time. If the user indicates a desire to make the payment then, at step 1306, the coin-type digital currency device 100 is activated, illustratively, the user places a finger (e.g., their thumb) on the surface of the fingerprint recognition and detection portion 112 and holds that position for a defined period of time (e.g., as defined visually by an illumination response from the plurality of LEDs 106 flashing at end of the defined period of time) until their fingerprint identification is verified as being associated with the coin-type digital currency device 100. Once the user's fingerprint identification is so verified, the coin-type digital currency device 100 is activated and the plurality of LEDs 106 remain on for further visual verification then the coin-type digital currency device 100 is placed proximate to the communications device (e.g., a smartphone) and a communications link is established and, at step 1308, RF signal and visual communications are executed, as detailed above, for user validation and the exchange of user identification information. At step 1310, responsive to verifying the identity of the user of the coin-type digital currency device, receiving, by the coin-type digital currency device, the payment transaction (e.g., a payment value associated with the bill payment transaction), and verifying a current value associated with the coin-type digital currency device 100 for payment approval. If the payment is not approved (e.g., the current value is less than the payment value) then, at step 1312, alerting the user and the user may set a reminder for a later payment or send a cancellation notice to the third party and the third party has the option of resubmitting another notification as some future date or contacting the user to discuss payment option, and the payee, at step 1314, has the choice to rebill later or contact user to discuss a coarse of action.

If the payment is approved (e.g., the current value is greater than the payment value), then approving the bill payment transaction including determining, at step 1322 (see, FIG. 14), any exchange rate adjustments by comparing the country code for the payee to the country code associated with the user's coin-type digital currency device 100. At step 1316, recording the transaction, and updating the current value associated with the coin-type digital currency device and, at step 1318, transmitting, from the communications device, a prompt to remove the coin-type digital from the position proximate to the communications device and displaying update results to the user. At step 1324 (see FIG. 15), recording any taxation information associated with bill payment transaction and, at step 1320, transmitting, from the communications device, an update regarding the bill payment transaction to the third party and a financial institution associated with the coin-type digital currency device 100.

In this way, the coin-type digital currency device and associated methods of the disclosed embodiments herein provides for a portable smart coin that has a universal and variable value with enhanced security features that include, but are not limited to, the use of the aforementioned RF signaling in combination with the optical communications that employ the assigned coin identity, user/owner identity, country identity and financial institution identity, alone or in combination. The combination of the radio communications and optical communications lead to the delivery of secure transactions across a variety of hardware whereby such transactions are transparent in nature and may take into account a variety of financial features such as currency fluctuations and tax implications, to name just a few. Also, notably, the coin-type digital currency device not only identifies the user and their associated account but also verifies the currency balance associated with the account without a further communication to a remote approval source.

As noted above, in some embodiments the method or methods described above may be executed or carried out by a computing system including a non-transitory computer-readable storage medium, also described herein as a storage machine, that holds machine-readable instructions executable by a logic machine (i.e., a processor or programmable control device) to provide, implement, perform, and/or enact the above described methods, processes and/or tasks. When such methods and processes are implemented, the state of the storage machine may be changed to hold different data. For example, the storage machine may include memory devices such as various hard disk drives, CD, or DVD devices. The logic machine may execute machine-readable instructions via one or more physical information and/or logic processing devices. For example, the logic machine may be configured to execute instructions to perform tasks for a computer program. The logic machine may include one or more processors to execute the machine-readable instructions. The computing system may include a display subsystem to display a graphical user interface (GUI), or any visual element of the methods or processes described above. For example, the display subsystem, storage machine, and logic machine may be integrated such that the above method may be executed while visual elements of the disclosed system and/or method are displayed on a display screen for user consumption. The computing system may include an input subsystem that receives user input. The input subsystem may be configured to connect to and receive input from devices such as a mouse, keyboard, or gaming controller. For example, a user input may indicate a request that certain task is to be executed by the computing system, such as requesting the computing system to display any of the above-described information or requesting that the user input updates or modifies existing stored information for processing. A communication subsystem may allow the methods described above to be executed or provided over a computer network. For example, the communication subsystem may be configured to enable the computing system to communicate with a plurality of personal computing devices. The communication subsystem may include wired and/or wireless communication devices to facilitate networked communication. The described methods or processes may be executed, provided, or implemented for a user or one or more computing devices via a computer-program product such as via an application programming interface (API).

Thus, the steps of the disclosed method (see, e.g., FIGS. 9-15) and the associated discussion herein above can be defined by the computer program instructions stored in a memory and/or data storage device and controlled by a processor executing the computer program instructions. Accordingly, by executing the computer program instructions, the processor executes an algorithm defined by the disclosed method. For example, the computer program instructions can be implemented as computer executable code programmed by one skilled in the art to perform the illustrative operations defined by the disclosed methods. Further, it will be appreciated that any flowcharts, flow diagrams, state transition diagrams, pseudo code, program code and the like represent various processes which may be substantially represented in computer readable medium and so executed by a computer, machine, or processor, whether or not such computer, machine or processor is explicitly shown. One skilled in the art will recognize that an implementation of an actual computer or computer system may have other structures and may contain other components as well, and that a high level representation of some of the components of such a computer is for illustrative purposes.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A coin-type digital currency device comprising:
   a body having a predetermined form factor;
   a base of the body having a cavity formed therein;
   a battery portion embedded within the cavity of the base configured for powering the coin-type digital currency device;
   an optical communication portion embedded within and forming the body, the optical communication portion further comprising:
      a plurality of light emitting diodes (LEDs), the plurality of LEDs configured for providing a visual identification specific to the coin-type digital currency device; and
      a plurality of image capture devices;
   a fingerprint recognition and detection portion embedded within and forming the body and coupled to the optical communication portion, the fingerprint recognition and detection portion configured for verifying an identity of a user specific to the coin-type digital currency device;
   an integrated circuit portion embedded within and forming the body and coupled to the optical communication portion, the fingerprint recognition and detection portion and the battery, the integrated circuit portion further comprising at least:
      a processor; and
      one or more memory devices storing instructions that cause the processor to perform operations comprising at least:
         activating, using at least the fingerprint recognition and detection portion and the plurality of LEDs, the coin-type digital currency device for use in a transaction associated with the user.

2. The coin-type digital currency device of claim 1, wherein the integrated circuit portion further comprises an antenna and a communication transceiver, and wherein the operations performed by the processor further comprise:
   transmitting, using at least the antenna and the communication transceiver, a first RF signal to a communications device alerting the communications device that the transaction is awaiting execution and containing at least a first identification code specific to the coin-type digital currency device, the coin-type digital currency device being in a position proximate to the communications device and remaining in the position proximate to the communications device until the transaction is completed.

3. The coin-type digital currency device of claim 2, wherein the operations performed by the processor further comprise:
   establishing a secure communications link between the coin-type digital currency device and the communications device through verifying an identity of the coin-type digital currency device and the communications device.

4. The coin-type digital currency device of claim 3, wherein the operations performed by the processor in the establishing a secure communication link operation further comprises:
   transmitting a second RF signal, between the coin-type digital currency device and the communications device, communicating the first identification code specific to the coin-type digital currency device and a second identification code specific to the communications device; and
   receiving, from the communications device, a visual communication signal, the visual communication signal comprising at least a visual pattern specific to and recognizable by the coin-type digital currency device.

5. The coin-type digital currency device of claim 4, wherein the visual pattern is defined by a series of lines and geometric shapes represented using a variety of colors.

6. The coin-type digital currency device of claim 4, wherein the visual pattern is configured for presentation via a visual display on the communications device.

7. The coin-type digital currency device of claim 4, wherein the operations performed by the processor further comprise:
   upon verifying the identity of the coin-type digital currency device and the communications device, approving, by the coin-type digital currency device, the transaction.

8. The coin-type digital currency device of claim 7, wherein the operations performed by the processor further comprise:
   executing the transaction by transmitting at least one encrypted RF signal, between the coin-type digital currency device and the communications device, identifying a set of transaction details including at least a merchant identification, and receiving at least one retransmission, during the transmitting of the at least one encrypted RF signal, of the visual communication signal to the coin-type digital currency device for verifying that the coin-type digital currency device remains in the position proximate to the communications device during the transmitting of the at least one encrypted RF signal.

9. The coin-type digital currency device of claim 8, wherein the operations performed by the processor further comprise:
   registering the transaction and updating a currency balance associated with the coin-type digital currency device.

10. The coin-type digital currency device of claim 1, wherein the integrated circuit portion further comprises:
    a bus controller for communicatively coupling at least the integrated circuit portion, the optical communication portion, and the fingerprint recognition and detection portion.

11. The coin-type digital currency device of claim 4, wherein the integrated circuit portion further comprises:
    a graphics processing unit, and wherein the visual pattern is recognized by the coin-type digital currency device using at least the plurality of image capture devices and the graphics processing unit.

12. The coin-type digital currency device of claim 1, wherein the integrated circuit portion further comprises:

an input/output (I/O) controller for managing communications from and to the coin-type digital currency device.

13. The coin-type digital currency device of claim 1, wherein the predetermined form factor is a coin shape form factor.

14. The coin-type digital currency device of claim 1, wherein the body further comprises at least one transparent window integrated therein for visualizing optical communications from the coin-type digital currency device.

15. The coin-type digital currency device of claim 1, wherein the coin-type digital currency device employs a combination of RF communications and optical communications, the optical communications comprising at least one visual pattern comprising a series of vertical lines, horizontal lines, diagonal lines and/or geometric shapes represented using a variety of colors, the at least one visual pattern being specific to and recognizable by the coin-type digital currency device for verification and identification of the coin-type digital currency device and transactional details associated with the use of the coin-type digital currency device.

16. A coin-type digital currency device comprising:
a body having a predetermined form factor;
a base of the body having a cavity formed therein;
a battery portion embedded within the cavity of the base configured for powering the coin-type digital currency device;
an optical communication portion embedded within and forming the body, the optical communication portion further comprising:
a plurality of light emitting diodes (LEDs), the plurality of LEDs configured for providing a visual identification specific to the coin-type digital currency device; and
a plurality of image capture devices;
a fingerprint recognition and detection portion embedded within and forming the body and coupled to the optical communication portion, the fingerprint recognition and detection portion configured for verifying an identity of a user specific to the coin-type digital currency device;
an integrated circuit portion embedded within and forming the body and coupled to the optical communication portion, the fingerprint recognition and detection portion and the battery, the integrated circuit portion further comprising at least:
a processor;
an antenna;
a communication transceiver; and
one or more memory devices storing instructions that cause the processor to perform operations comprising at least:
activating, using at least the fingerprint recognition and detection portion and the plurality of LEDs, the coin-type digital currency device for use in a transaction associated with the user;
transmitting, using at least the antenna and the communication transceiver, a first RF signal to a communications device alerting the communications device that the transaction is awaiting execution and containing at least a first identification code specific to the coin-type digital currency device, the coin-type digital currency device being in a position proximate to the communications device and remaining in the position proximate to the communications device until the transaction is completed; and establishing a secure communications link between the coin-type digital currency device and the communications device through verifying an identity of the coin-type digital currency device and the communications device.

17. The coin-type digital currency device of claim 16, wherein the coin-type digital currency device further comprises:
transmitting a second RF signal, between the coin-type digital currency device and the communications device, communicating the first identification code specific to the coin-type digital currency device and a second identification code specific to the communications device; and
receiving, from the communications device, a visual communication signal, the visual communication signal comprising at least a visual pattern specific to and recognizable by the coin-type digital currency device.

18. The coin-type digital currency device of claim 17, wherein the visual pattern is defined by a series of lines and geometric shapes represented using a variety of colors and configured for presentation via a visual display on the communications device.

19. A coin-type digital currency device comprising:
a body having a predetermined form factor, the body comprising at least one transparent window integrated therein for visualizing optical communications from the coin-type digital currency device, and wherein the predetermined form factor is a coin shape form factor;
a base of the body having a cavity formed therein;
a battery portion embedded within the cavity of the base configured for powering the coin-type digital currency device;
an optical communication portion embedded within and forming the body, the optical communication portion further comprising:
a plurality of light emitting diodes (LEDs), the plurality of LEDs configured for providing a visual identification specific to the coin-type digital currency device; and
a plurality of image capture devices;
a fingerprint recognition and detection portion embedded within and forming the body and coupled to the optical communication portion, the fingerprint recognition and detection portion configured for verifying an identity of a user specific to the coin-type digital currency device;
an integrated circuit portion embedded within and forming the body and coupled to the optical communication portion, the fingerprint recognition and detection portion and the battery, the integrated circuit portion further comprising at least:
a processor;
an antenna;
a communication transceiver;
a graphics processing unit;
an input/output (I/O) controller for managing communications from and to the coin-type digital currency device;
a bus controller for communicatively coupling at least the integrated circuit portion, the optical communication portion, and the fingerprint recognition and detection portion; and
one or more memory devices storing instructions that cause the processor to perform operations comprising at least:
activating, using at least the fingerprint recognition and detection portion and the plurality of LEDs, the coin-type digital currency device for use in a transaction associated with the user;

transmitting, using at least the antenna and the communication transceiver, a first RF signal to a communications device alerting the communications device that the transaction is awaiting execution and containing at least a first identification code specific to the coin-type digital currency device, the coin-type digital currency device being in a position proximate to the communications device and remaining in the position proximate to the communications device until the transaction is completed;

transmitting a second RF signal, between the coin-type digital currency device and the communications device, communicating the first identification code specific to the coin-type digital currency device and a second identification code specific to the communications device;

receiving, from the communications device, a visual communication signal, the visual communication signal comprising at least one visual pattern specific to and recognizable by the coin-type digital currency device, wherein the at least one visual pattern comprising a series of vertical lines, horizontal lines, diagonal lines and/or geometric shapes represented using a variety of colors and recognizable by the coin-type digital currency device using at least the plurality of image capture devices and the graphics processing unit; and establishing a secure communications link between the coin-type digital currency device and the communications device through verifying an identity of the coin-type digital currency device and the communications device.

20. The coin-type digital currency device of claim 19, wherein the transaction is one of a purchasing transaction, a payment transaction, a credit transaction, and a debit-type transaction.

\* \* \* \* \*